United States Patent
Adachi

(10) Patent No.: US 7,920,664 B2
(45) Date of Patent: Apr. 5, 2011

(54) CLOCK SYNCHRONIZATION CIRCUIT

(75) Inventor: Takahiro Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 11/864,042

(22) Filed: Sep. 28, 2007

(65) Prior Publication Data

US 2008/0080650 A1 Apr. 3, 2008

(30) Foreign Application Priority Data

Oct. 3, 2006 (JP) ................................ 2006-271764

(51) Int. Cl.
H04L 7/00 (2006.01)

(52) U.S. Cl. ........ 375/355; 375/354; 375/357; 375/359; 375/363; 327/141; 455/132; 455/504

(58) Field of Classification Search .................. 375/355
See application file for complete search history.

(56) References Cited

U.S. PATENT DOCUMENTS

| | | | | |
|---|---|---|---|---|
| 5,018,166 A | * | 5/1991 | Tjahjadi et al. | 375/232 |
| 5,696,639 A | * | 12/1997 | Spurbeck et al. | 360/51 |
| 5,812,336 A | * | 9/1998 | Spurbeck et al. | 360/51 |
| 5,844,920 A | * | 12/1998 | Zook et al. | 714/769 |
| 5,909,332 A | * | 6/1999 | Spurbeck et al. | 360/51 |
| 6,111,710 A | * | 8/2000 | Feyh et al. | 360/46 |
| 6,411,658 B1 | * | 6/2002 | Sasaki | 375/326 |
| 7,093,151 B1 | * | 8/2006 | Williams | 713/500 |
| 7,456,682 B2 | * | 11/2008 | Adachi | 329/308 |
| 2004/0164798 A1 | * | 8/2004 | Adachi et al. | 330/149 |
| 2006/0189295 A1 | * | 8/2006 | Adachi | 455/337 |
| 2006/0203937 A1 | * | 9/2006 | Burgio | 375/317 |
| 2009/0189648 A1 | * | 7/2009 | Hochleitner et al. | 327/98 |

FOREIGN PATENT DOCUMENTS

| | | |
|---|---|---|
| EP | 0609095 A | 8/1994 |
| EP | 0881764 A | 12/1998 |
| JP | 06284159 | 10/1994 |
| JP | 08167841 | 6/1996 |
| JP | 2000049882 | 2/2000 |
| JP | 2000349745 | 12/2000 |
| JP | 2001237908 A | 8/2001 |
| JP | 2003330569 A | 11/2003 |
| JP | 2004064469 | 2/2004 |
| WO | 9812836 A | 3/1998 |

OTHER PUBLICATIONS

European Search Report for EP 07 01 8395 completed Sep. 1, 2009.
J. Bao et al., "A New Timing Recovery Method for DTV Receivers", IEEE Transactions on Consumer Electronics, vol. 44, No. 4, Nov. 1998, pp. 1243-1248, XP000871421.
F. M. Gardner, "Interpolation in Digital Modems—Part I : Fundamentals". IEEE Transactions on Communications, vol. 41, No. 3, Mar. 1993, pp. 501-507, XP000372693.

* cited by examiner

Primary Examiner — Chieh M Fan
Assistant Examiner — Santiago Garcia

(57) ABSTRACT

A clock synchronization circuit includes a clock generation circuit generating a sampling clock for sampling a received signal from an output of a local oscillator, a phase error detection circuit finding a phase error between sampling timing of the sampling clock and ideal sampling timing, and a timing correction circuit finding a correction quantity to correct a frequency error between a frequency of the sampling clock and a frequency of the ideal sampling timing and the phase error every sampling timing of the sampling clock, and outputting a sampling value interpolated according to the found correction quantity.

9 Claims, 7 Drawing Sheets

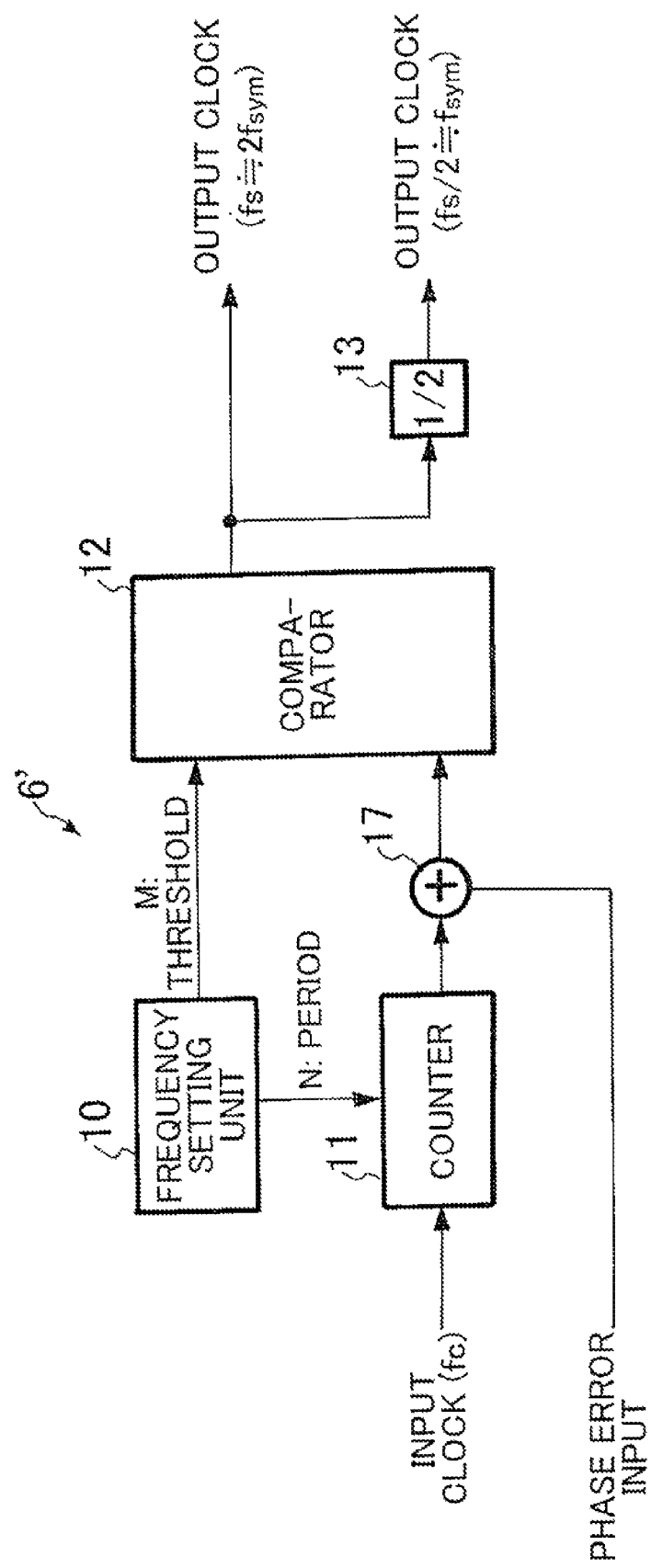

CLOCK SYNCHRONIZATION CIRCUIT

This application is based upon and claims the benefit of priority from Japanese patent application No. 2006-271764, filed on Oct. 3, 2006, the disclosure of which is incorporated herein in its entirety by reference.

BACKGROUND OF THE INVENTION

1. Field of the Invention

The present invention relates to a clock synchronization circuit to be used for reception processing in a digital wireless communication system.

2. Description of the Related Art

In the digital wireless communication system, a clock synchronization circuit is used to detect information for deciding sampling timing of a received signal from the received signal itself. Typically, the conventional clock synchronization circuit is formed of a circuit including a mixture of an analog circuit and a digital circuit. For example, the conventional clock synchronization circuit has a configuration in which error detection and averaging of sampling timing are conducted by the digital circuit and its result is supplied to a voltage-controlled oscillator (VCO) via digital/analog conversion (D/A) to rationalize the sampling timing. Systems having such a configuration are described in, for example, Japanese Patent Application Laid-Open (JP-A) 2000-349745 and JP-A 2000-049882.

SUMMARY OF THE INVENTION

However, the conventional clock synchronization circuit has a problem that it is difficult to hold down the product cost because analog elements such as the voltage-controlled oscillator and the digital/analog converter are needed. Furthermore, there is also a fear that the capture range will be varied by a change in element characteristics caused by a change in ambient temperature because analog elements are included.

The present invention has been made in view of the problem. An object, of the present invention is to provide a technique for forming a clock synchronization circuit in a demodulation circuit, of only a digital circuit.

A clock synchronization circuit according to the present invention includes a clock generation circuit generating a sampling clock for sampling a received signal of wireless communication, from an output of a local oscillator, a phase error detection circuit finding a phase error between sampling timing of the sampling clock and ideal sampling timing, and a timing correction circuit finding a correction quantity to correct a frequency error between a frequency of the sampling clock and a frequency of the ideal sampling timing and the phase error every sampling timing of the sampling clock, and outputting a sampling value interpolated according to the found correction quantity.

According to the present invention, analog elements such as the voltage-controlled oscillator and the D/A converter become unnecessary in the clock synchronization circuit for processing a received signal of wireless communication. As a result, a remarkable cost reduction can be anticipated. Furthermore, stable clock synchronization that does not depend upon the variation with time or the temperature change can be implemented because the clock synchronization circuit is formed of only a digital circuit.

BRIEF DESCRIPTION OF THE DRAWINGS

FIG. 7 is a block diagram of a clock generator in the second embodiment.

DESCRIPTION OF THE INVENTION

Figure 1:
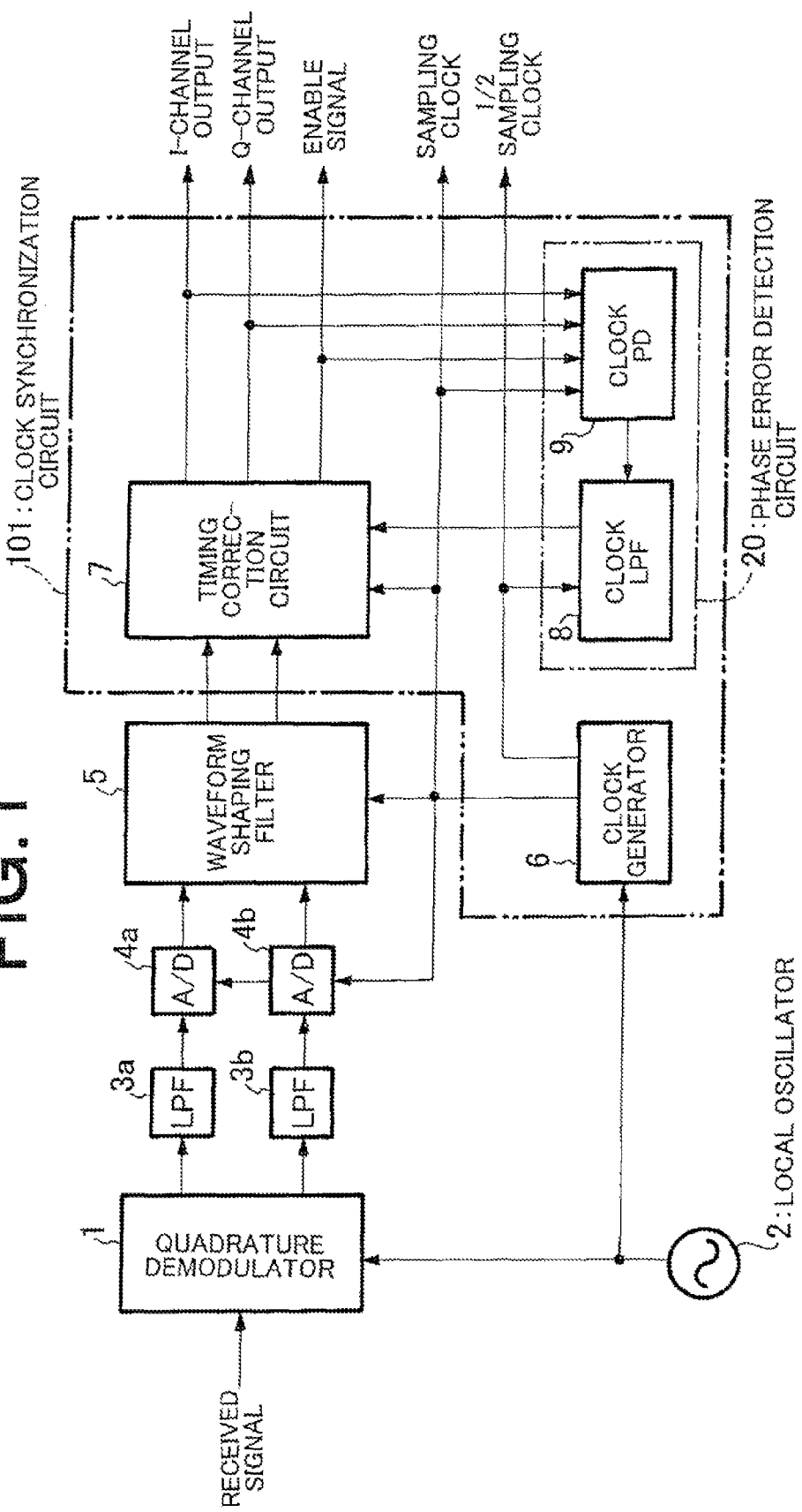
FIG. 1 is a block diagram showing a configuration according to a first embodiment of the present invention.

FIG. 1 shows a configuration according to an embodiment of the present invention. The present embodiment is an example in which a clock synchronization circuit (101) according to the present invention is applied to a demodulation circuit of a baseband sampling quasi-synchronization detection scheme in a digital wireless communication system.

The clock synchronization circuit 101 includes a clock generator 6 which generates a sampling clock signal to sample a received signal, a phase error detection circuit 20 which generates phase error information that concerns the sampling clock and that will be described later, and a timing correction circuit 7 which outputs a sampling value according to a sampling clock corrected on the basis of the sampling clock supplied from the clock generator 6 and the phase error information supplied from the phase error detection circuit 20. All of these circuits (6, 7 and 20) are formed of digital circuits.

The phase error detection circuit 20 includes a clock PD (Phase Detector) 9 which detects the phase error of the sampling clock and a clock LPF 8 which serves as a loop filter for generating phase error information by averaging the detected phase error and supplying the phase error information to the timing correction circuit 7.

In FIG. 1, an input received signal is converted to baseband signals by a quadrature demodulator 1 supplied with an output of a local oscillator. The baseband signals are subjected to band limiting processing in an LPF 3a and an LPF 3b, and then sampled by an A/D 4a and an A/D 4b. The sampled data are input to the timing correction circuit 7 in the clock synchronization circuit 101 via a waveform shaping filter 5.

The clock generator 6 generates the sampling clock by utilizing the output of the local oscillator 2. The generated sampling clock is supplied to the A/D 4a, the A/D 4b, the waveform shaping filter 5, the timing correction circuit 7, and the clock PD 9. The frequency of the local oscillator 2 may be in the range of approximately several tens to several hundreds MHz applied to the general demodulation circuit. In the present embodiment, it is supposed that the clock generator 6 generates the sampling clock in the range of several MHz to several tens MHz by utilizing the output of the local oscillator 2. However, these numerical values are nothing hut examples, and the application range of the present invention is not restricted by the numerical values.

Figure 2:
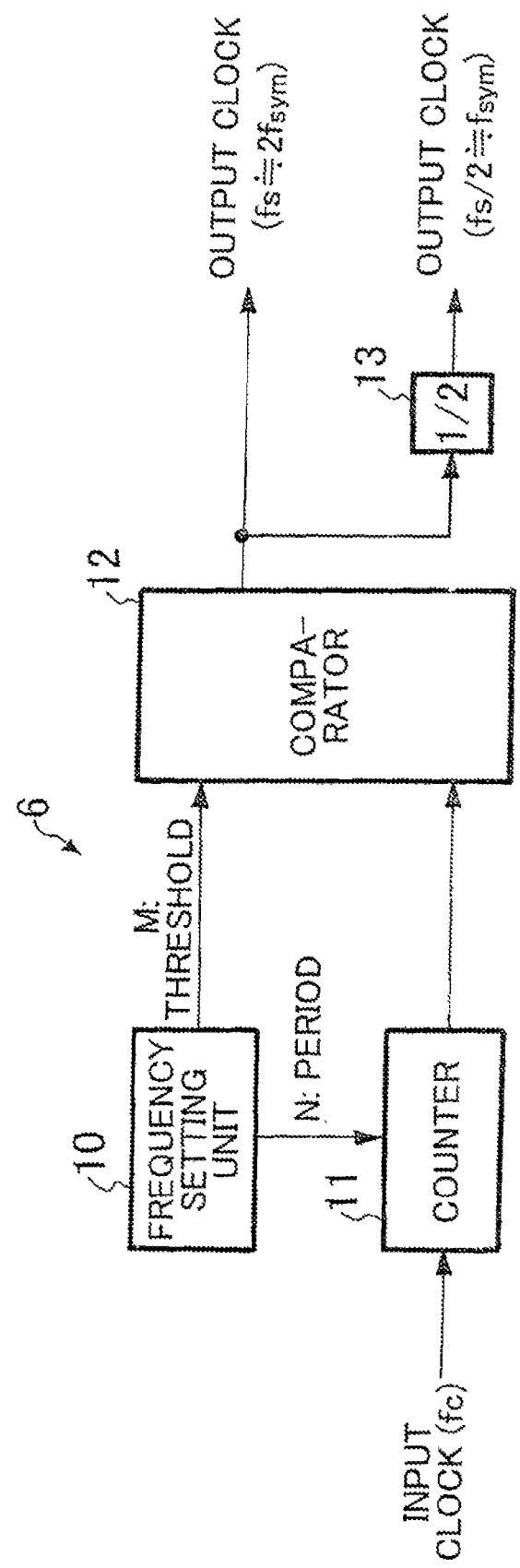
FIG. 2 is a block diagram of a clock generator in the first embodiment.

FIG. 2 shows a detailed configuration of the clock generator 6. A counter 11 counts input clock pulses having an oscillation frequency fc of the local oscillator 2. At this time, the counter 11 repeats the counting while clearing the count value each time the count value arrives at a predetermined count value supplied from a frequency setting unit 10. A comparator 12 compares the count value in the counter 11 with the threshold supplied from, the frequency setting unit 10. If the count value is equal to or greater than the threshold, the comparator 12 outputs a bi-valued information signal "1." If the count value is less than the threshold, the comparator 12 outputs a bi-valued information signal "0." In this way the clock generator 6 generates a sampling clock having a frequency that is at least twice the symbol rate and that is a minimum realizable.

The clock generator 6 generates a clock that is half in frequency the sampling clock, i.e., that is substantially equal in frequency to the symbol rate by dividing the frequency of the sampling clock to ½ using a divider 13. This clock is supplied to the clock LPF 8.

Figure 3:
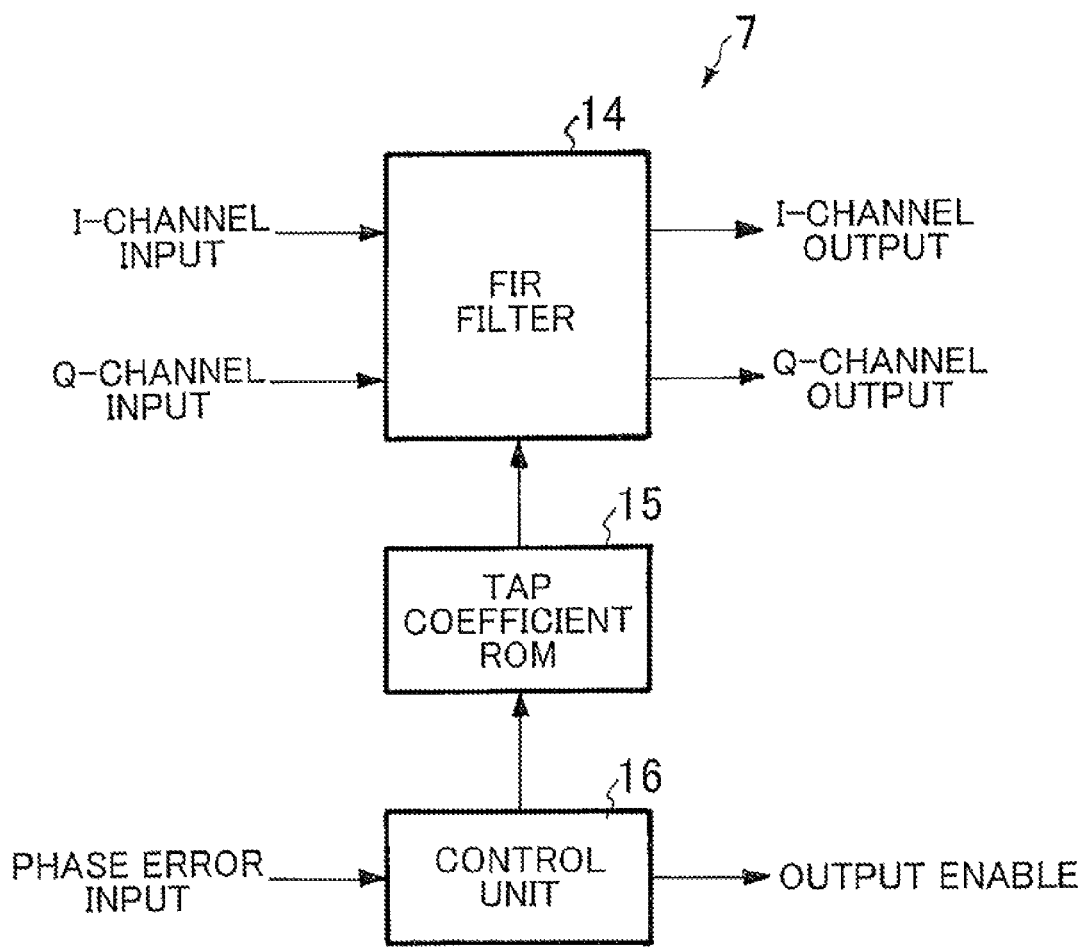
FIG. 3 is a block diagram of a timing correction circuit in the first embodiment.

FIG. 3 shows a detailed configuration of the timing correction circuit 7. A control unit 16 finds a required correction quantity on the basis of phase error information supplied from the clock LPF 8 about the phase error of sampling timing and a difference between the sampling rate to be originally applied and an actual sampling rate supplied from the clock generator 6. Tap coefficients previously associated with various supposed correction quantities are stored in a tap coefficient ROM 15. The control unit 16 selects tap coefficients associated with the calculated correction quantity and supplies the tap coefficients to an FIR filter 14.

The FIR filter 14 finds a sampling value at sampling timing corrected in phase error and frequency error by using the supplied tap coefficients, and outputs the sampling value. In order to prevent the same symbols from being output consecutively from the FIR filter 14 by the correction, the control unit 16 outputs an enable signal described later.

The clock PD 9 detects the phase error of sampling timing from data output from the timing correction circuit 7, and supplies the phase error to the clock LPF 8. The clock LPF 8 supplies phase error information obtained by averaging the error signal supplied from the clock PD 9 to the timing correction circuit 7.

By the way the quadrature demodulator 1, the waveform shaping filter 5, the clock LPF 8 and the clock PD 9 are well known to those skilled in the art, and detailed description of them, will be omitted.

Operation of the present embodiment will now be described. The received signal input to the quadrature demodulator 1 is converted to baseband signals I-channel and Q-channel. Then, unnecessary high frequency components are removed by the LPF 3a and LPF 3b. Resultant signals are converted to digital signals by the A/D 4a and the A/D 4b. The digital signals output from the A/D 4a and the A/D 4b are input to the waveform shaping filter 5. During that time, the clock, generator 6 takes in the output of the local oscillator 2 for demodulation, as the operation clock of the counter 11. And the clock generator 6 generates the sampling clock having a frequency that is at least twice the symbol rate and that is a minimum realizable, and a clock obtained by dividing the frequency to ½.

The clock generator 6 generates the sampling clock as described below. Since a symbol rate fsym of the received signal and an oscillation frequency fc of the local oscillator 2 are already known, a period N of the counter 11 for generating the sampling clock is found by using the following equation (1).

$$N = int[fc/(2 \times fsym)] \quad (1)$$

Here, int [a] represents an integer which is equal to "a" or a maximum integer which is less than "a". A threshold M of the comparator 12 is found by using the following equation (2) which includes the period N obtained from the equation (1).

$$M = int[N/2] \quad (2)$$

In the clock generator 6, the counter 11 repeats counting ranging from "0" to "N−1" based on the period N. During that time, the comparator 12 outputs "0" when the count value is less than the threshold M, and outputs "1" when the count value is at least the threshold M. As a result, the comparator 12 generates a clock having a frequency that is at least the original sampling frequency and that is a minimum realizable. Here, the original sampling frequency means the sampling frequency stipulated in the current wireless communication, and it is an already known value.

Furthermore, the clock generator 6 generates a clock having a frequency that is half of the frequency of the sampling clock by dividing the frequency of the sampling clock using a divider 13. By the way, if the period N is an odd number, the duty of the sampling clock does not become 50%. Since only a rising edge or a falling edge is typically used, however, the period N is justified to be an odd number.

In this way the output of the local oscillator 2 is used by the clock generator 6 to generate the sampling clock. The oscillation frequency of the local oscillator 2 is approximately several tens times that of the sampling clock at most as described above. If the oscillation frequency is, for example, more than one hundred times the frequency of the sampling clock, it is easy to implement an ideal sampling clock with which the received signal can be sampled with high precision. However, the realistic oscillation frequency is comparatively low. Therefore, an error is caused in sampling timing based upon the sampling clock of the clock generator 6 as compared with ideal sampling timing. Therefore, this error is corrected by the timing correction circuit 7.

Figure 4:
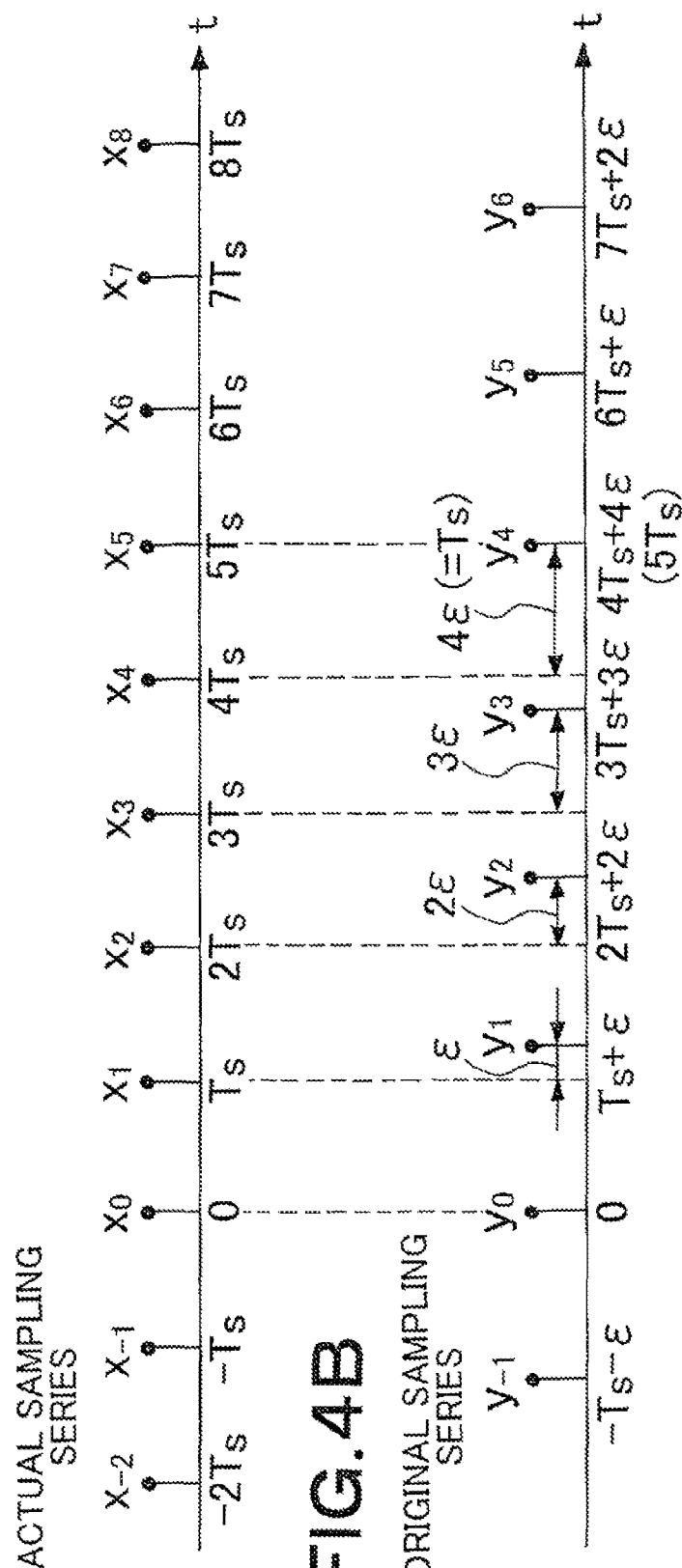
FIG. 4 is a diagram for explaining an error of sampling timing in the first embodiment.

Operation of the timing correction circuit 7 will now be described with reference to FIG. 4. In FIG. 4, a series xn in (a) represents a sampling value based upon the actual sampling clock output by the clock generator 6. A series yn in (b) represents an original sampling value, i.e., a sampling value at the above described ideal sampling timing. Time t at each sampling timing is represented by using "Ts." The sampling period in the actual sampling series (a) is Ts.

The series (a) and (b) shown in FIG. 4 are series in the case where the ratio between the actual sampling frequency and the original sampling frequency is "4:5." The actual sampling frequency and the original sampling frequency are already known. The control unit 16 in the timing correction circuit 7 previously finds a ratio such as "4:5" from those already known values.

It is now supposed that a time point at which the actual sampling timing coincides with the original sampling timing is "t=0." The next timing in the actual sampling timing is "t=Ts" and the next timing is "t=2Ts" as shown in FIG. 4(a). On the other hand, timing subsequent to the original sampling timing "t=0" is represented as "t=Ts+ϵ" as compared with the actual "t=Ts" as shown in FIG. 4(b). In addition, the next timing is represented as "t=2Ts+2ϵ" as compared with the actual "t=2Ts."

The original sampling timing becomes "t=4Ts+4ϵ" as compared with the actual sampling timing "t=4Ts." The original sampling timing "t=4Ts+4ϵ" coincides with the actual sampling timing "t=5Ts." This is based upon the fact that the frequency error in the present case is "4:5." The error "4ϵ" at this time is equivalent to the sampling interval "Ts".

The example shown in FIG. 4 indicates the state of the frequency error in which the difference between the actual sampling timing and the original sampling timing increases by accurately ϵ every clock, As a matter of fact, however, a phase error is also caused in the sampling clock by an output error of the local oscillator 2. The phase error is detected by the phase error detection circuit 20, and supplied to the timing correction circuit 7 as the above-described phase error information.

The control unit 16 in the timing correction circuit 7 finds a correction quantity required for each sampling timing one after another by tingeing the frequency error with the supplied phase error. If the found correction quantity becomes more than the timing period, the sampling value found by using the correction quantity is invalidated during that time. Invalidation control will be described later. At sampling timing subsequent to sampling timing at which invalidation is applied, invalidation is canceled and the correction quantity is reset to "0."

Figure 5:
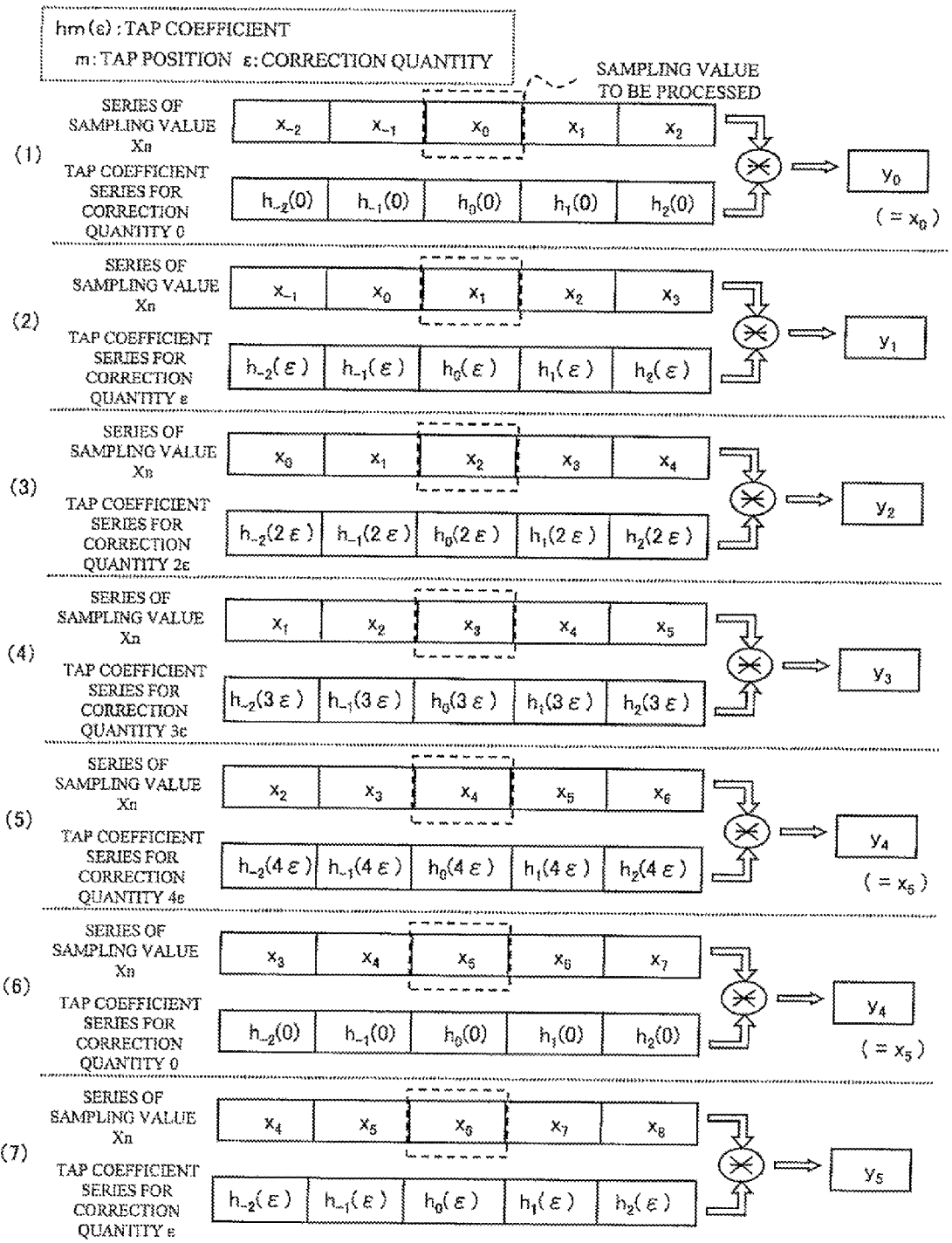
FIG. 5 is a diagram for explaining processing in the timing correction circuit in the first embodiment.
Figure 6:
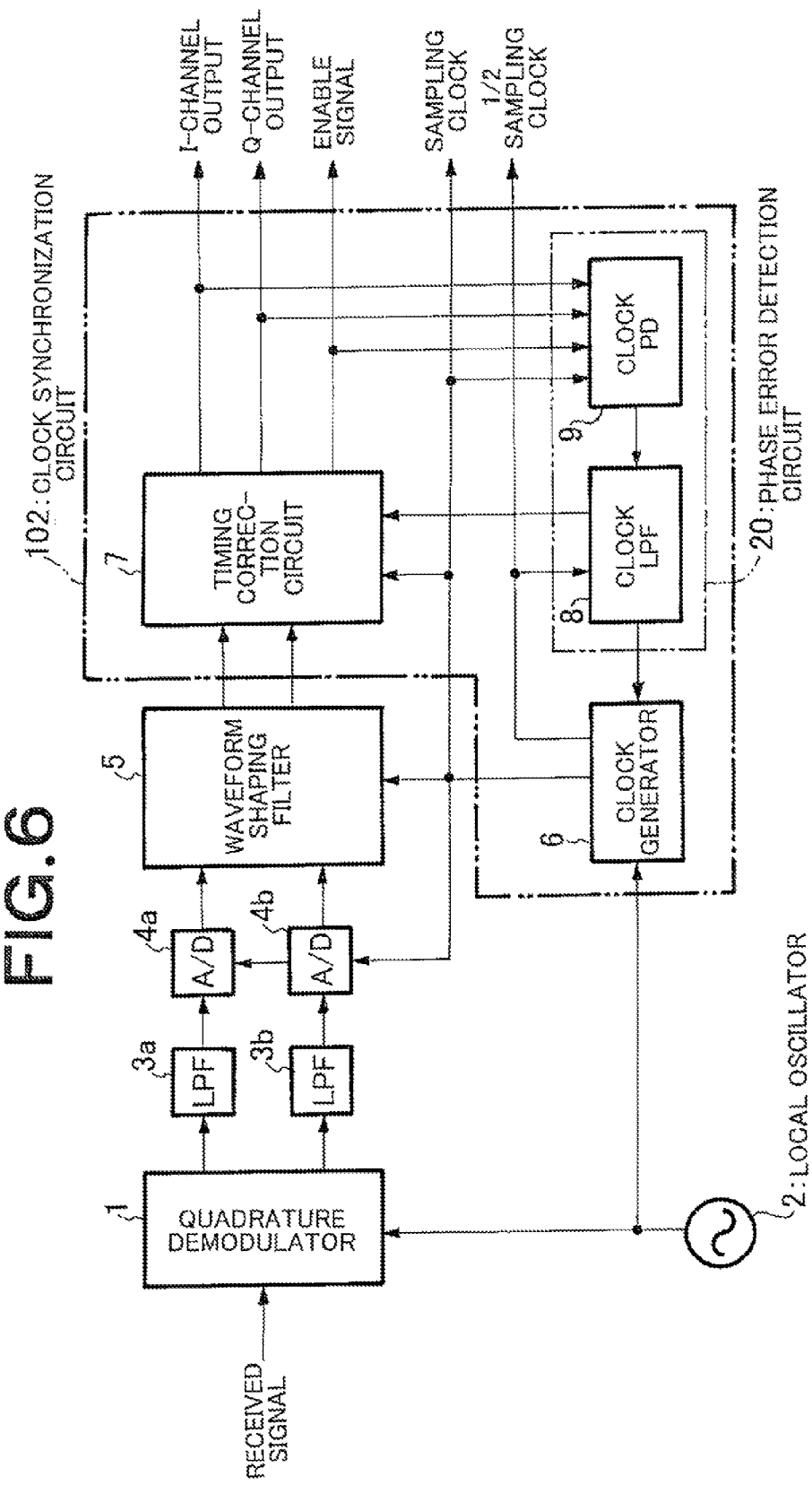
FIG. 6 is a block diagram showing a configuration according to a second embodiment of the present invention.

On the other hand, series of tap coefficients as shown in FIG. 5 are previously stored in the tap coefficient ROM 15 in the timing correction circuit 7. These tap coefficients are obtained by associating values ranging from "0" to "Ts" in impulse response obtained from the sine function or other LPF characteristics with correction quantities. As described above, the correction quantity is the value found by the control unit 16 by tingeing with the frequency error and phase error of the sampling clock.

The sampling value xn (n=0, 1, 2, ...) is input to the FIR filter 14 in the timing correction circuit 7 via the A/D 4a and 4b and the waveform shaping filter 5. When the sampling value xn to be processed is supplied to the FIR filter 14, the control unit 18 reads out tap coefficients hm (m: tap position) associated with a correction quantity found for xn from the tap coefficient ROM 15 and supplies the tap coefficients hm to the FIR filter 14.

The FIR filter 14 executes a convolution operation on the series of the given tap coefficients and the series of sampling values around xn to be processed, and outputs resultant yn. The yn is a sampling value at sampling timing obtained by interpolation processing on the actual sampling timing group, and it is substantially a sampling value with the correction quantity found by the control unit 18 tinged.

The processing in the FIR filter 14 will be described more concretely. Here, the case shown, in FIG. 4 will be described supposing that the correction quantity is equal to the frequency error in order to simplify the description. In other words, it is supposed that phase error information indicating that there is no phase error is supplied from the clock LPF 8.

In FIG. 4, the actual sampling timing and the original sampling timing coincide with each other, for example, at "t=0." Therefore, the correction quantity for the sampling value "$x_0$" is "0." At this time, the control unit 16 selects a tap coefficient series hm(0) associated with the correction quantity "0" shown in (1) in FIG. 5. And the FIR filter 14 finds a post-correction sampling value "$y_0$" at "t=0" by performing a convolution operation on the selected tap coefficient series hm(0) and a series around the sampling value "$x_0$" as shown in (1) In FIG. 5.

As appreciated from FIG. 4, the error is "$\epsilon$" at the next timing "t=Ts." In this case, a tap coefficient series hm($\epsilon$) associated with the correction quantity $\epsilon$ is supplied to the FIR filter 14 as shown in (2) in FIG. 5. As a result, a sampling value at "$y_1$" at "t=Ts+$\epsilon$" is found for a sampling value "$x_1$" to be processed.

As shown in (3) to (7) of FIG. 5, at ensuing timing points as well, the FIR filter 14 successively executes convolution operations on the series around, the sampling value xn input every clock (Ts) and a series of tap coefficients corresponding to the correction quantity. As a result, the sampling values yn at the original sampling timing are found successively.

In FIG. 4, an output "$y_4$" with a correction quantity "$4\epsilon$" tinged at "t=4Ts" and an output "$y_4$" of a correction quantity "0" at the next "t=5Ts" represent two values at equivalent timing. However, the fact that these values are output means that two sampling values at the same sampling timing are output, consecutively. As a result, improper demodulation data is supplied to a subsequent stage.

When the correction quantity becomes more than the sampling period (Ts) as in the former case "t=4Ts," therefore, the control unit 18 outputs an enable signal for invalidating the sampling value found tinged with the correction quantity, in the subsequent circuit. In other words, the output "$y_4$" at "t=4Ts" is invalidated by an enable signal representing that the output value is invalid.

In addition, at the next timing "t=5Ts," the control unit 16 outputs an enable signal representing that the output value is valid in order to cancel the invalidation of the output value. At this time, the correction quantity is reset to "0." As a result, "$y_4$" output with the correction quantity "0" tinged is processed validly in the subsequent circuit. Owing to such control, it is possible to prevent sampling values at equivalent sampling timing from overlapping in the demodulation data.

If the corrected sampling value is output from the timing correction circuit 7 as a result of the processing, the corrected sampling value is supplied to the subsequent circuit and the clock PD 9. Upon receiving the above-described invalidation enable signal, the circuit subsequent to the timing correction circuit 7 invalidates input data and maintains the current state. In the subsequent circuit as well, therefore, data substantially having the symbol rate is supplied properly.

The clock PD 9 detects a phase error in sampling timing left in the output of the timing correction circuit 7, and supplies the phase error to the clock LPF 8. As the method for detecting the phase error, for example, the conventional known method called zero cross method can be used. Its details are disclosed in JP-A 2000-349745. The clock LPF 8 averages the phase error supplied from the clock. PD 9 and supplies the averaged phase error to the timing correction circuit 7 as phase error information.

By repeating the operation heretofore described, the timing correction circuit 7 interpolates a value at ideal sampling timing on data sampled at the sampling clock generated by the clock generator 6, and outputs it to the subsequent circuit. The subsequent circuit outputs demodulation data via processing such as carrier synchronization and waveform equalization.

According to the present embodiment, the clock synchronization circuit that is conventionally implemented by using an analog-digital hybrid circuit can be implemented by using only a digital circuit. As a result, analog elements such as the voltage-controlled oscillator and the D/A converter become unnecessary. Therefore, a remarkable cost reduction can be anticipated. Furthermore, stable clock synchronization that does not depend upon the variation with time or the temperature change can be implemented because the clock synchronization circuit is formed of only a digital circuit.

FIG. 8 shows a configuration according to another embodiment of the present invention. In a clock synchronization circuit 102 according to the present embodiment, phase error information generated by the clock LPF 8 is supplied to the timing correction circuit 7 and the clock generator 6' in parallel.

FIG. 7 shows a configuration of the clock generator 6' in the present embodiment. The clock generator 6' includes an adder 17 which adds phase error information supplied from the clock LPF 8 to the output of the counter 11, in addition to the configuration shown in FIG. 2. The clock frequency can be changed according to a change of the phase error by thus adding a configuration for adding the phase error between the counter 11 and the comparator 12.

The clock frequency may be changed by adaptively changing the threshold M or the counter period N set by the frequency setting unit 10, instead of adding the phase error as described above.

In the embodiments, the clock LPF 8 is operated with a symbol rate, i.e., a clock generated by frequency division to ½ in the clock generator 6. Alternatively, the clock LPF 8 may be operated with the sampling clock. According to the configuration in which the clock LPF 8 is operated with the symbol rate as in the embodiments, the circuit scale and the power dissipation can be held down. According to the other configuration in which the clock LPF 8 is operated with the sampling clock, the setting width in the frequency characteristics of the clock LPF 8 can be secured wider.

In the embodiments, the clock synchronization circuit according to the present invention is applied to the demodulator in the baseband sampling system. However, the application object may be a demodulator in the IF sampling system.

Although the exemplary embodiments of the present invention have been described in detail, it should be understood that various changes, substitutions and alternatives can be made therein, without departing from the sprit and scope of the invention as defined by the appended claims. Further, it is the inventor's intent to retrain all equivalents of the claimed invention even if the claims are amended during prosecution.

What is claimed is:

1. A clock synchronization circuit comprising:
   a clock generation circuit generating a sampling clock for sampling a received signal of wireless communication, from an output of a local oscillator;
   a phase error detection circuit finding a phase error between sampling timing of the sampling clock and ideal sampling timing; and
   a timing correction circuit finding a correction quantity to correct a frequency error between a frequency of the sampling clock and a frequency of the ideal sampling timing and the phase error every sampling timing of the sampling clock, and outputting a sampling value interpolated according to the found correction quantity; and
   wherein the timing correction circuit comprises:
   a storage element retaining tap coefficients respectively associated with the correction quantities beforehand;
   a control circuit finding the correction quantity and selecting tap coefficients associated with the correction quantity; and
   a filter circuit finding the interpolated sampling value by performing a convolution operation on the selected, tap coefficients and a sampling value obtained at the sampling timing of the sampling clock; and
   wherein when the found correction quantity becomes more than a period of the sampling clock, the control circuit outputs an enable signal for invalidating a sampling value interpolated according to the correction quantity.

2. The clock synchronization circuit according to claim 1, wherein the clock generation circuit comprises:
   a counter circuit counting output pulses of the local oscillator with a period based on an oscillation frequency of the local oscillator; and
   a comparison circuit comparing a threshold associated with the period with a count value in the counter circuit and outputting bi-valued information representing a result of the comparison.

3. The clock synchronization circuit according to claim 2, wherein the clock generation circuit further comprises a frequency division circuit dividing the frequency of the sampling clock supplied from the comparison circuit to half.

4. The clock synchronization circuit according to claim 2, wherein the clock generation circuit further comprises an addition circuit adding an output of the counter circuit and the phase error found by the phase error detection circuit, and inputting a result of the addition to the comparison circuit.

5. The clock synchronization circuit of claim 1, wherein the clock synchronization circuit renders an analog voltage-controlled oscillator and a digital-to-analog converter unnecessary in processing the received signal of the wireless communication.

6. The clock synchronization circuit of claim 1, wherein the local oscillator is a non-analog non-voltage-controlled oscillator.

7. The clock synchronization circuit of claim 1, wherein clock synchronization performed by the clock synchronization circuit does not depend upon variation in time or temperature change.

8. The clock synchronization circuit of claim 1, wherein the clock synchronization circuit is completely digital.

9. A timing correction circuit comprising:
   a circuit finding a correction quantity required to correct a phase error between sampling timing of a sampling clock for sampling a received signal in wireless communication and ideal sampling timing and a frequency error between a frequency of the sampling clock and a frequency of the ideal sampling at timing every sampling timing of the sampling clock and outputting a sampling value interpolated according to the found correction quantity; and wherein the circuit comprises:
   a storage element retaining tap coefficients respectively associated with the correction quantities beforehand;
   a control circuit finding the correction quantity and selecting tap coefficients associated with the correction quantity; and
   a filter circuit finding the interpolated sampling value by performing a convolution operation on the selected tap coefficients and a sampling value obtained at the sampling timing of the sampling clock; and wherein when the found correction quantity becomes more than a period of the sampling clock, the control circuit outputs an enable signal for invalidating a sampling value interpolated according to the correction quantity.

* * * * *